(12) United States Patent
Hyung et al.

(10) Patent No.: US 9,254,571 B2
(45) Date of Patent: Feb. 9, 2016

(54) ROBOT AND METHOD FOR CREATING PATH OF THE ROBOT

(75) Inventors: Seung Yong Hyung, Yongin-si (KR); Kyung Shik Roh, Seongnam-si (KR); Suk June Yoon, Seoul (KR); Sung Hwan Ahn, Anyang-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 926 days.

(21) Appl. No.: 13/307,169

(22) Filed: Nov. 30, 2011

(65) Prior Publication Data

US 2012/0158178 A1 Jun. 21, 2012

(30) Foreign Application Priority Data

Dec. 20, 2010 (KR) ........................ 10-2010-0130843

(51) Int. Cl.
*B25J 9/10* (2006.01)
*B25J 9/16* (2006.01)
*G05D 1/02* (2006.01)

(52) U.S. Cl.
CPC ............... *B25J 9/1666* (2013.01); *G05D 1/024* (2013.01); *G05D 1/0274* (2013.01); *G05B 2219/40442* (2013.01); *G05B 2219/40475* (2013.01)

(58) Field of Classification Search
CPC . G05D 1/0231; G05D 1/0246; G05D 1/0248; G05D 1/0253; G05D 1/0212; G06T 7/0081; G06T 7/0087
USPC ................. 701/300, 301, 25, 26, 28; 700/255
See application file for complete search history.

(56) References Cited

U.S. PATENT DOCUMENTS

| 7,447,593 B2* | 11/2008 | Estkowski et al. ............ 701/301 |
| 7,507,948 B2* | 3/2009 | Park et al. ..................... 250/221 |
| 8,073,196 B2* | 12/2011 | Yuan et al. .................... 382/103 |
| 8,253,802 B1* | 8/2012 | Anderson et al. ............. 348/169 |
| 2007/0299559 A1* | 12/2007 | Janssen et al. ................. 700/259 |
| 2009/0154769 A1* | 6/2009 | Yoon et al. .................... 382/103 |
| 2010/0161225 A1* | 6/2010 | Hyung et al. ................. 701/301 |

OTHER PUBLICATIONS

M. Kobilarov, G. Sukhatme, J. Hyams and P. Batavia, "People tracking and following with mobile robot using an omnidirectional camera and a laser," In Proc. 2006 IEEE International Conference on Robotics and Automation, Orlando, FL, May 2006.*
M. Han, A. Sethi, W. Hua and Y. Gong, "A Detection-Based Multiple Object Tracking Method," In Proc. 2004 International Conference on Image Processing, 2004, pp. 3065-3068.*

* cited by examiner

*Primary Examiner* — Thomas G Black
*Assistant Examiner* — Peter D Nolan
(74) *Attorney, Agent, or Firm* — Harness, Dickey & Pierce, P.L.C.

(57) ABSTRACT

A robot and a method for creating a robot path. The method for planning the robot path includes generating a depth map including a plurality of cells by measuring a distance to an object, dividing a boundary among the plurality of cells into a plurality of partitions according to individual depth values of the cells, and extracting a single closed loop formed by the divided boundary, obtaining a position and shape of the object located at a first time through the extracted single closed loop, calculating a probability that the object is located at a second time after t seconds on the basis of the obtained position and shape of the object located at the first time, and creating a moving path simultaneously while avoiding the object according to the calculated probability, thereby creating an optimum path without colliding with the object.

22 Claims, 10 Drawing Sheets

ROBOT AND METHOD FOR CREATING PATH OF THE ROBOT

CROSS-REFERENCE TO RELATED APPLICATIONS

This application claims the benefit of Korean Patent Application No. 2010-0130843, filed on Dec. 20, 2010 in the Korean Intellectual Property Office, the disclosure of which is incorporated herein by reference.

BACKGROUND

1. Field

Embodiments relate to a robot and a method for creating a robot path so as to form an optimum path in a dynamic space.

2. Description of the Related Art

In recent times, unmanned technologies have been introduced. As such, many developers are conducting intensive research into position recognition technology and intelligent path planning. In order to enable the robot to move, the robot must recognize its own position, recognize the position of a destination, and recognize various obstacles present between the robot and the destination, such that it has to plan a path along which the robot can move while avoiding such obstacles. The above-mentioned task that looks like a simple task has not been conducted naturally in the same manner as in other animals, and may be considered to be the most serious obstacle in intelligent utilization of the robot. In order to perform the above-mentioned process, position recognition technology, obstacle sensing technology, and path creating technology need to be well matched organically and then operated.

In general, the optimum path under the environment having a moving obstacle has been solved using the term of a Configuration space (C-space). There are a variety of methods for reducing complexity of the C-space from among several obstacles.

In one example of such methods, the overall process is divided into a process of searching for a path and a process of moving the robot along a peripheral part of the path, and is being developed to the process for providing an optimum speed track that satisfies a dynamic constraint condition while avoiding the moving obstacles.

However, the above-mentioned related art has a difficulty in acquiring data in real time. The above-mentioned related art has to basically recognize whether a structure such as an object or wall occupies the moving space through stereoscopic (3D) data. If the space is occupied by an obstacle or structure, the robot has to move while avoiding the corresponding space. In order to perform the above-mentioned operation, the above-mentioned related art has to obtain 3D data using a sensor or data stored in the robot. Specifically, under the general situation in which the robot has to detect the moving object while in motion, it is necessary to acquire data at very high speed. In other words, the related art unavoidably consumes a long period of time to detect the moving object, and is unable to detect an optimum moving path.

SUMMARY

Therefore, it is an aspect of an embodiment to provide a robot and a method for creating a robot path.

Additional aspects of embodiments will be set forth in part in the description which follows and, in part, will be obvious from the description, or may be learned by practice of embodiments.

In accordance with an aspect of an embodiment, a method for planning a path of a robot includes generating a depth map including a plurality of cells by measuring a distance to an object, dividing a boundary among the plurality of cells into a plurality of partitions according to individual depth values of the cells, and extracting a single closed loop formed by the divided boundary, obtaining a position and shape of the object located at a first time through the extracted single closed loop, calculating a probability that the object is located at a second time after t seconds on the basis of the obtained position and shape of the object located at the first time, and creating a moving path simultaneously while avoiding the object according to the calculated probability.

The extracted single closed loop is extracted through a binary large object (Blob) algorithm.

The obtaining of the position and shape of the object located at the first time through the extracted single closed loop may include obtaining the position of the object on the basis of an average of depth values of one or more pixels contained in the single closed loop, and obtaining the shape of the object on the basis of the shape of the single closed loop.

The calculating of the probability that the object is located at a second time after t seconds on the basis of the obtained position and shape of the object located at the first time may include calculating the probability that the object is located at the second time after t seconds on the basis of the obtained position and shape of the object using a Joint Probability Data Association Filter (JPDAF).

The JPDAF includes a Kalman filter algorithm.

The creating of the moving path simultaneously while avoiding the object according to the calculated probability may include displaying a 2D shape based on the calculated probability of the object presence in 3D space according at the time (t).

The creating of the moving path simultaneously while avoiding the object according to the calculated probability may include dividing the 3D space into a plurality of lattices, each of which has a predetermined length and a predetermined time.

The plurality of lattices may be a plurality of nodes, each of which is used as a reference point to create the path.

The creating of the moving path simultaneously while avoiding the object according to the calculated probability may include determining any one of the nodes to be a departure node, selecting a destination node acting as a destination point of the path, and calculating a distance cost obtained by accumulation of distance values ranging from the selected node to another node acting as an intermediate node toward the destination node.

The creating of the moving path simultaneously while avoiding the object according to the calculated probability related to the object presence may include calculating an obstacle cost indicating a probability that the robot encounters a 2D shape having the calculated probability related to the object presence.

The creating of the moving path simultaneously while avoiding the object according to the calculated probability related to the object presence may include summing the distance cost and the obstacle cost, and forming a path having a minimum sum of the distance cost and the obstacle cost.

The method may further include determining whether the created path will arrive at the destination node.

The determining whether the created path will arrive at the destination node may include, if the created path will not arrive at the destination node, resetting another node to the departure node.

In accordance with another aspect of an embodiment, a robot includes a Time Of Flight (TOF) sensor to generate a depth map including a plurality of cells by measuring a distance to an object; an object detector to divide a boundary between several cells into a plurality of partitions according to a depth of each cell, extract a single closed loop formed by the divided boundary, and detect the position and shape of the object located at a first time using the extracted single closed loop; an object estimator to calculate a probability that the object is located at a second time after t seconds on the basis of the detected position and shape of the object located at the first time; and a path creator to create a moving path without colliding with the object according to the calculated probability.

The object detector may detect the position and shape of the object located at the first time using a binary large object (Blob) algorithm.

The object detector may obtain the position of the object on the basis of an average of depth values of one or more pixels contained in the single closed loop, and obtain the shape of the object on the basis of the shape of the single closed loop.

The object estimator may calculate the probability that the object is located at a second time after t seconds on the basis of the obtained position and shape of the object using a Joint Probability Data Association Filter (JPDAF).

The path creator may display a 2D shape based on the calculated probability of the object presence in 3D space according to the time (t), and divide the 3D space into a plurality of lattices, each of which has a predetermined length and a predetermined time, wherein the plurality of lattices is a plurality of nodes, each of which is used as a reference point to create the path.

The path creator may determine any one of the nodes to be a departure node, select a destination node acting as a destination point of the path, and calculate a distance cost obtained by accumulation of distance values ranging from the selected node to another node acting as an intermediate node toward the destination node.

The path creator may include an obstacle-cost calculator to calculate an obstacle cost indicating a probability that the robot encounters a 2D shape having the calculated probability related to the object presence.

The path creator may sum the distance cost and the obstacle cost, and form a path having a minimum sum of the distance cost and the obstacle cost.

The path creator may determine whether the created path will arrive at the destination node. If the created path will not arrive at the destination node, the path creator may reset another node to the departure node.

BRIEF DESCRIPTION OF THE DRAWINGS

These and/or other aspects of embodiments will become apparent and more readily appreciated from the following description of the embodiments, taken in conjunction with the accompanying drawings of which.

DETAILED DESCRIPTION

Figure 1:
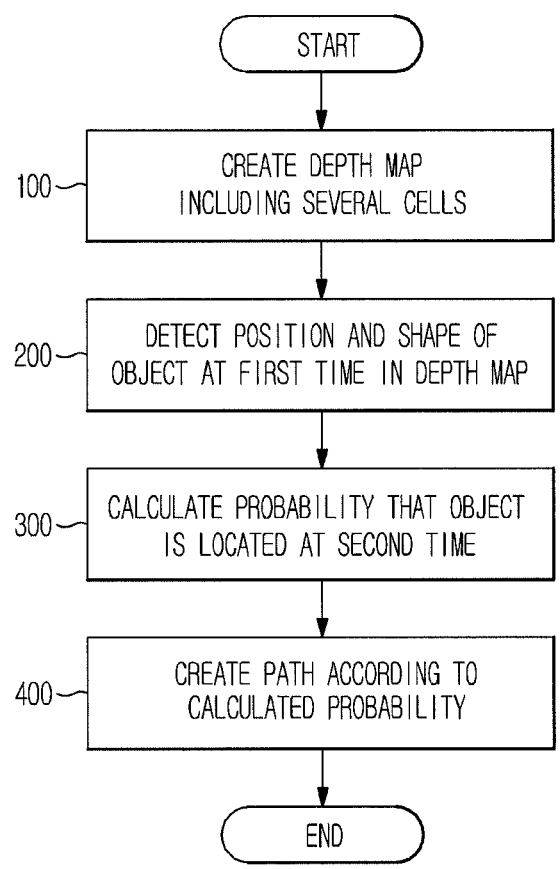
FIG. 1 is a flowchart illustrating a method for creating a robot path according to an embodiment.

Reference will now be made in detail to embodiments, examples of which are illustrated in the accompanying drawings, wherein like reference numerals refer to like elements throughout.

FIG. 1 is a flowchart illustrating a method for creating a robot path according to an embodiment.

Referring to FIG. 1, a depth map including a plurality of cells is created in operation 100.

When creating a depth map, a Time Of Flight (TOF) sensor may be used. A light emitting unit of the TOF sensor generates infrared light or laser light, and a light receiving unit measures the distance from a reflector. The depth map is composed of a plurality of pixels, and distance information is recorded in the depth map, such that the depth map is configured in a 3D format.

The depth map is a stereoscopic uneven image. Provided that the position and posture of measuring the TOF sensor are recognized, it can be recognized what material is fully contained in the space using the geometric method, or it can also be recognized whether or not the space is filled with the material. In accordance with an embodiment, a dynamic part of the object can be extracted using the depth map obtained at intervals of a predetermined time.

Next, the position and shape of the object present at a first time are detected through the created depth map in operation 200.

In operation 200, the first time indicates one time at which an object is captured through the TOF sensor. The position and posture of the object are identical to the position and shape contained in the depth map captured at the first time.

The probability that the object is located at a second time that is equal to a time after the lapse of t seconds on the basis of the position and shape of the object at the first time in operation 300.

In this case, the second time indicates a time provided when t seconds elapse from the first time. When the object moves with time, it can be predicted where the object is at the predetermined time (i.e., t seconds).

In more detail, the above-mentioned process probably predicts the position to which the object can move and be located after the lapse of t seconds on the basis of the position and posture of the object obtained at the first time. That is, the above-mentioned process probably indicates the position where the object can be located after the lapse of t seconds on the basis of the position, shape, and speed information of the object obtained at the first time.

Next, the moving path of the robot is created according to the calculated probability in operation 400.

The position of the object considered to be an obstacle when the robot moves can be probably predicted on the basis of the aforementioned calculated probability, such that the moving path of the robot can avoid the obstacle. In other words, the robot can move with a minimum time and a minimum distance not to collide with the object acting as the obstacle.

Figure 2:
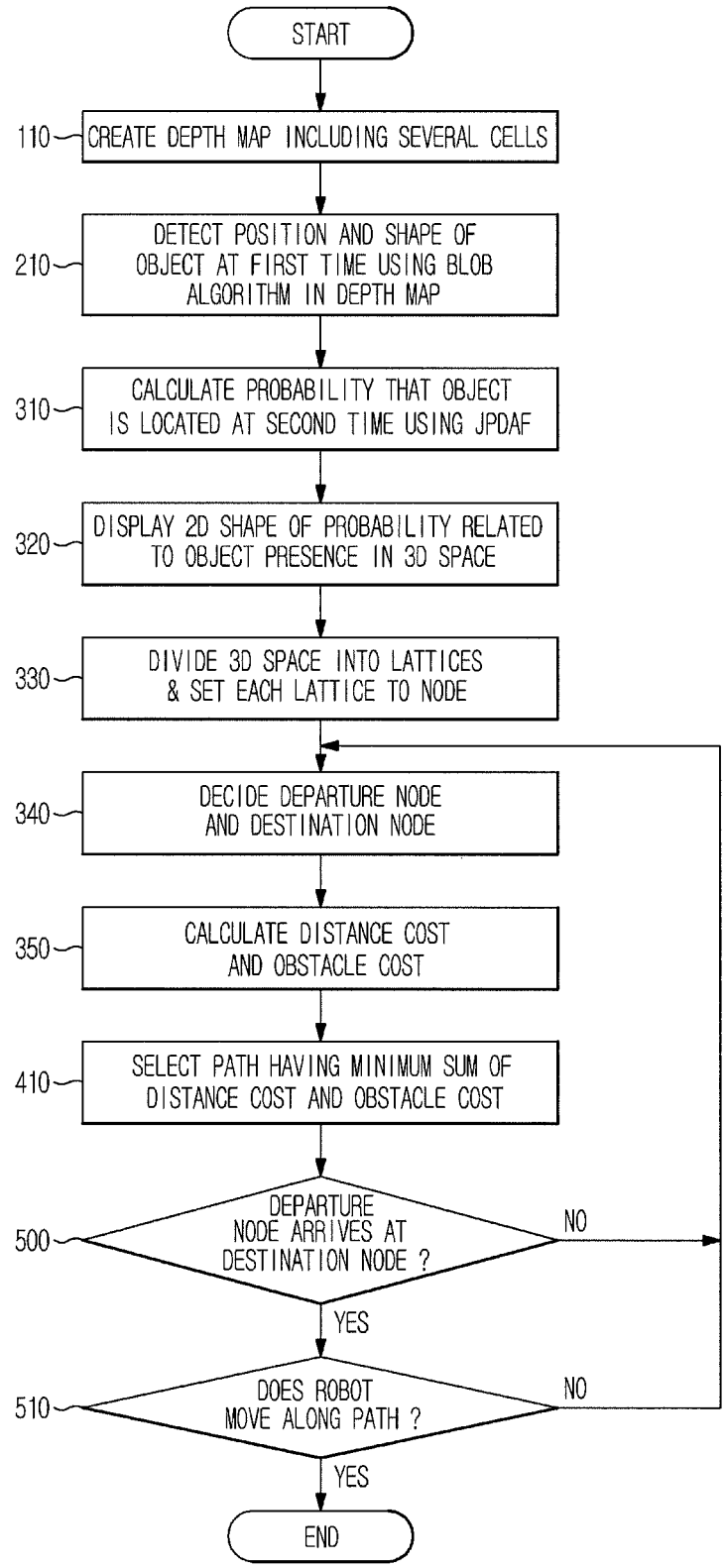
FIG. 2 is a flowchart illustrating a method for creating a robot path according to another embodiment.

FIG. 2 is a flowchart illustrating a method for creating a robot path according to another embodiment.

Referring to FIG. 1, when creating a robot path, a depth map including a plurality of cells is created in operation 110.

A Binary Large object (Blob) algorithm is applied to the created depth map so that the position and shape of the object at a first time are detected in operation 210.

Blob algorithm is used to detect the position and shape of the object present at the first time simultaneously while moving along a boundary of a plurality of cells contained in the depth map, on a binary map acting as a depth map.

Blob algorithm assumes that a cell value of a background is set to 0 and a cell value of a specific part recognized as a lump of object is set to 1. Under this assumption, if one closed loop is completed along a boundary line of the specific part having the cell value of 1, the corresponding closed loop is determined to be one Blob.

In addition, if noise is found in the created depth map, a wrong Blob may be decided. In order to remove the wrong Blob, if Blob is configured to have a predetermined number of cells or less, the corresponding Blob does not act as the correct Blob, so that the wrong Blob can be removed.

In addition, representative values of (x, y, z) are extracted by averaging depth values of cells contained in the Blob structure obtained through the Blob algorithm. Representative values may be used as sensor data detected by extracting each Blob center point.

Figure 4:
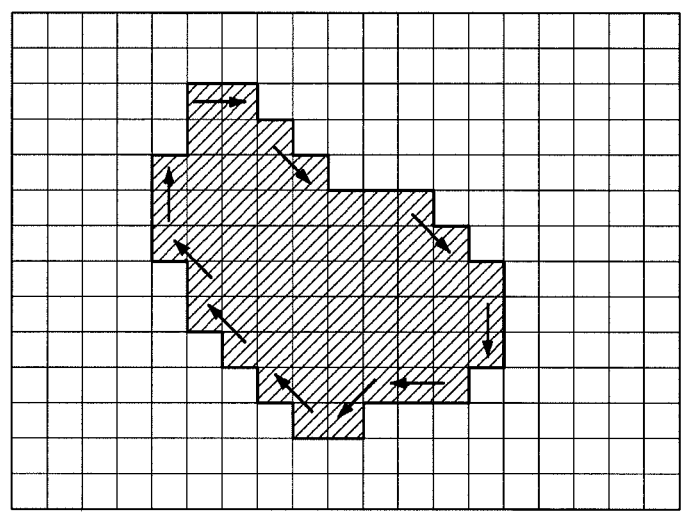
FIG. 4 is a conceptual diagram illustrating a binary large object (Blob) algorithm according to one another embodiment.

FIG. 4 is a conceptual diagram illustrating a method for detecting the position and shape of the object present at a first time by performing the Blob algorithm on a depth map. FIG. 4 is a conceptual diagram illustrating the Blob algorithm according to another embodiment.

Several cells constructing the depth map have different distance value (different depth values) according to the distance from the TOF sensor. Cells, that form the object captured by the TOF sensor, have similar depth values, and other cells constructing the background may also have similar depth values. If the Blob algorithm is performed according to the above-mentioned characteristics, the boundary of the object can be decided, and one closed loop may be predicted and detected as an object. The detected closed loop represents the position and shape of the object.

Subsequently, the probability that the object is located at a second time through a Joint Probability Data Association Filter (JPDAF) is calculated in operation 310.

JPDAF is used to track a plurality of moving objects, and is one data association method capable of mapping a plurality of predicted values to predict the state of an object to be tracked to a plurality of sensor values used as a basis of such prediction in such a manner that the highest probability among the predicted values and the sensor values is achieved. JPDAF has an advantage in that it can obtain an accurate predicted value of both an object moving at a constant velocity and another object moving at an acceleration velocity using the approximated mathematical model, and has robustness against clutter.

Accordingly, if the TOF sensor has poor throughput, JPDAF can track and detect the position and shape of the moving object even given a depth map having much noise.

In addition, JPDAF basically includes the Kalman filter algorithm. In the prediction process, each point has a mathematical model, and an integration update is applied to the mathematical model, such that it is possible to predict where the object is present at a second time.

In the above-mentioned process, an error covariance value of the position prediction value is also calculated according to precision of each model. In other words, in the case of the correct model, the predicted error covariance becomes lower. In the case of the incorrect model, the predicted error covariance becomes higher.

State variables regarding individual cell coordinates according to an embodiment can be established as follows, and the model used for the prediction process based on the Kalman filter can be represented by the following expression:

$$x = (x \quad v_x \quad y \quad v_y) \quad \text{[Expression]}$$

$$F = \begin{bmatrix} 1 & dt & 0 & 0 \\ 0 & 1 & 0 & 0 \\ 0 & 0 & 1 & dt \\ 0 & 0 & 0 & 1 \end{bmatrix} G = \begin{bmatrix} 0 & 0 \\ 1 & 0 \\ 0 & 0 \\ 0 & 1 \end{bmatrix} H = \begin{bmatrix} 1 & 0 & 0 & 0 \\ 0 & 0 & 1 & 0 \end{bmatrix}$$

$$x_{k+1} = Fx_k + Gw_k$$

$$y_k = Hx_k$$

In the above-mentioned expression, x denotes the X axis, $v_x$ is an X-directional velocity, 'y' denotes Y axis, and $v_y$ is Y-directional velocity. Individual Blob representative values extracted through the Blob algorithm are used as sensor data according to an embodiment. In the case of using each Blob, a representative value is obtained as a center value, and the obtained value is used as each sensor data for JPDAF.

However, data generated by the Blob algorithm may be different from the number of dynamic objects being continuously tracked as necessary. Therefore, the dynamic object must be most appropriately matched to the Blob.

Therefore, it is necessary to appropriately match the dynamic object to the Blob through JPDAF.

In addition, the sensor measurement value corresponding to each predicted value must be updated in the Kalman filter so as to reduce the predicted error of the filter. However, under this condition, it is impossible to recognize which measurement value is matched to a predicted value. However, the most approximate points are matched with each other in the update process through JPDAF, and the matching points having the most accurate predicted value are found, thereby updating the measurement value.

Through the JPDAF filtering process, the probability that the object is located at a second time can be calculated.

2D shape at the probability that the object is located is shown in a 3D space according to the time (t) in operation 320.

Figure 5:
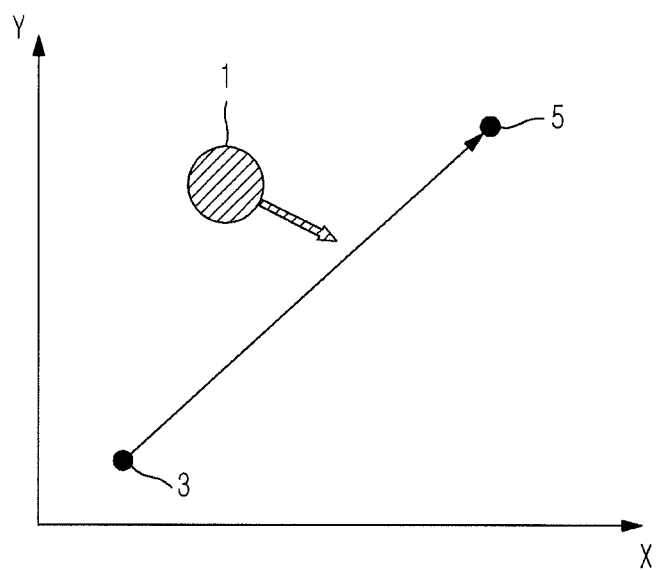
FIG. 5 is a conceptual diagram illustrating a preparation process for creating a robot path in a 2D space according to an embodiment.

FIG. 5 shows the appearance of the moving object (1) located in 2D space.

Figure 6:
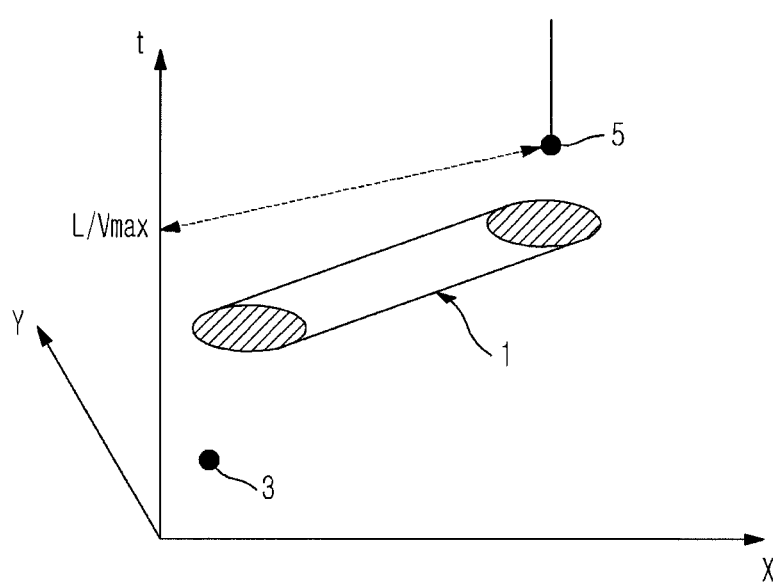
FIG. 6 is a conceptual diagram illustrating a preparation process for creating a robot path in a 3D space according to an embodiment.

Referring to FIG. 6, a Z-axis direction is set to a time axis (t axis) so that the moving object can be represented in a 3D manner. FIG. 6 is a conceptual diagram illustrating a preparation process for creating a robot path in a 3D space according to an embodiment.

Referring to FIG. 6, the object 1 moving in a 3D space is shown, the 3D space is divided into lattices, and each lattice is referred to as a node in operation 330.

Figure 7:
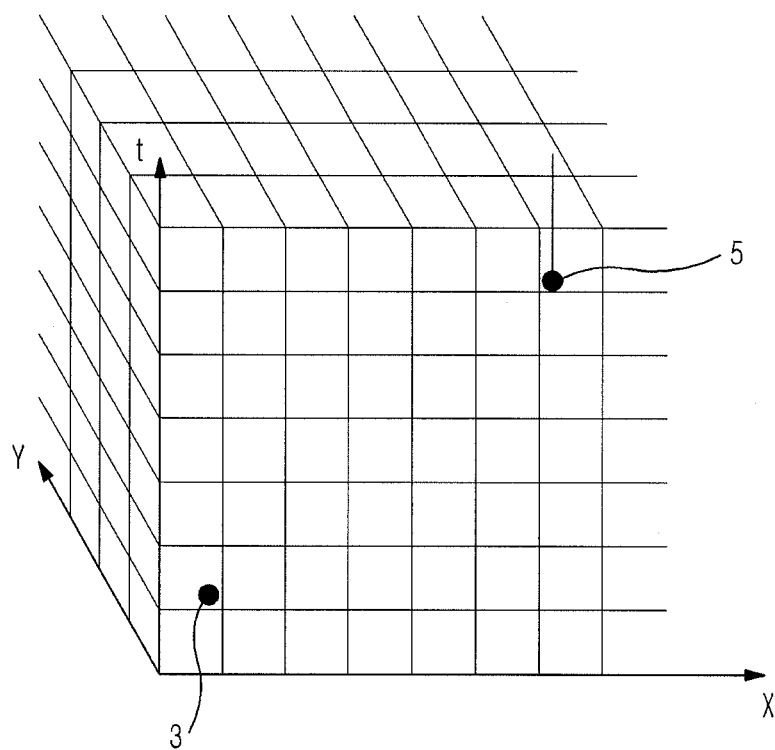
FIG. 7 is a conceptual diagram illustrating a method for latticing a 3D space according to an embodiment.

In this case, the operation for dividing the 3D space into lattices can be performed on the basis of a unit length and a predetermined unit time. FIG. 7 is a conceptual diagram illustrating a method for latticing a 3D space on the basis of a predetermined unit length and a predetermined unit time.

Then, any one of the nodes generated by such latticing is set to a departure node 3, and a node located at a destination point is set to a designation node 5 in operation 340.

A method for creating a robot path is as follows. The process for creating the robot path may include the following two steps.

First, a distance cost of the moving path of the robot and the obstacle cost are calculated in operation 350.

Referring to FIG. 6, a departure node 3 is located at the position (t=0) of a 2D space, and a destination node 5 is configured in the form of a straight line starting from one position, spaced apart from each of x and y positions by a distance corresponding to a predetermined time or longer, to an upper part of a t-axis. The straight line may be defined as a destination line.

A minimum height from the departure node 3 to the destination node 5 may correspond to a predetermined time during which the robot can move in a straight line at the highest speed.

In addition, each lattice has a cost. The distance cost and the obstacle cost are consumed while the robot moves from one lattice to another lattice. The distance cost is defined as 'dl', and the obstacle cost is defined as 'dG'.

The distance cost 'dl' indicates the distance used when the robot moves from one lattice to another lattice. The proceeding direction of the cell has directivity on the basis of the time axis, because the cell can move in an inverse direction within the space whereas it cannot move inversely on a time axis. Therefore, the proceeding direction on an arbitrary lattice (xi, yi, ti) is only the lattice in the increasing direction of the time axis.

In this case, the distance cost indicates a predetermined distance from one lattice to another lattice placed in the increasing direction of the time axis. In this case, although the distance is conceptually identical to the distance based on the Euclidean geometry, the time axis may also be considered to be a distance. Assuming that the size of one lattice is any one of dx, dy, or dt and the robot moves to another lattice placed in the increasing direction of the time axis, the distance cost can be represented by the following equation.

$$dl = \sqrt{dx^2 + dy^2 + w dt^2}$$ [Equation]

In Equation, 'w' is a weight on a time axis. In other words, 'w' is increased to apply a higher weight on the time axis, and 'w' is reduced to apply a lower weight on the time axis, such that a 3D distance concept is created. The 3D distance concept may be used as the distance cost.

The number of lattices in which the robot can enter according to a maximum speed is changed. The higher the speed, the higher the number of lattices placed in the increasing direction of the time axis related to one-unit time. In other words, if the maximum speed of the robot is doubled, the size of the movable area may also be doubled.

The obstacle cost indicates the probability that the moving object 1 is present on the lattice.

If the robot passes by each lattice, the obstacle cost related to each lattice is consumed. The obstacle cost is calculated on the basis of the probability that the object is located at a second time.

A figure may be formed in 3D space-time through the position, speed, and error covariance of the object 1 at a time of path creation, such that information indicating where the object 1 is at a certain time can be predicted with higher probability. In this case, assuming that the probability can be recognized at a certain time and the covariance related to the probability can also be recognized, the probability of positioning the moving object 1 can be extended on the basis of the JPDAF prediction process as shown in the following equation.

$$\hat{x}_{t+dt} = \hat{x}_t + \hat{v}_{xt} dt$$

$$\hat{y}_{t+dt} = \hat{y}_t + \hat{v}_{yt} dt$$ [Equation]

Figure 8:
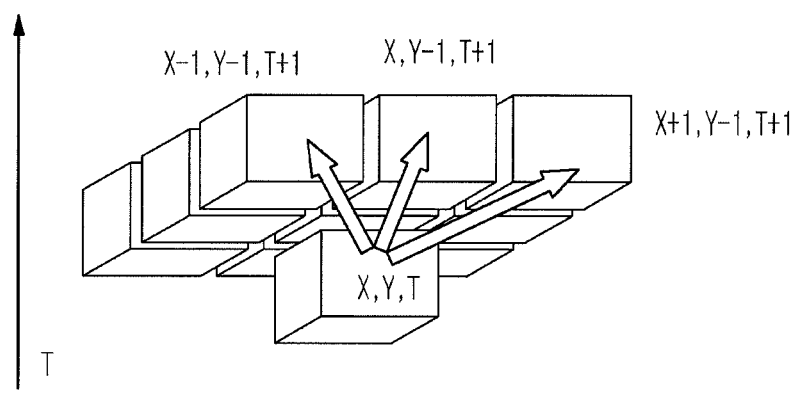
FIG. 8 is a conceptual diagram illustrating a node variation of a created robot path according to an embodiment.

FIG. 8 is a conceptual diagram illustrating node variation of a created robot path according to an embodiment.

Figure 10:
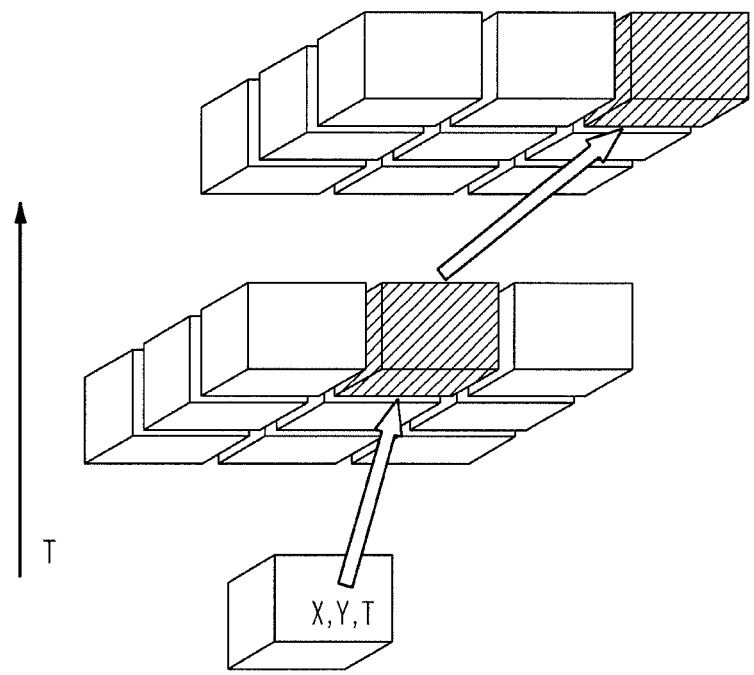
FIG. 10 is a conceptual diagram illustrating a method for creating a robot path according to an embodiment.

FIG. 10 is a conceptual diagram illustrating a method for creating a robot path according to an embodiment.

The error covariance P can be extended as shown in the following equation that indicates the range in which the object 1 can be present on the moving path.

$$P_{t+dt} = F P_t F^T + G Q G^T$$ [Equation]

In addition, the object 1 may have the probability distribution according to the aforementioned covariance as shown in the following equation.

$$dG(x, y) = \frac{1}{2\pi P} e^{-\frac{(x-\hat{x})^2 + (y-\hat{y})^2}{2P}}$$ [Equation]

Through this Equation, it can be determined if the object 1 moves at a constant speed and the area (probability) in which the object 1 can be present becomes larger according to lapse of time.

Figure 9:
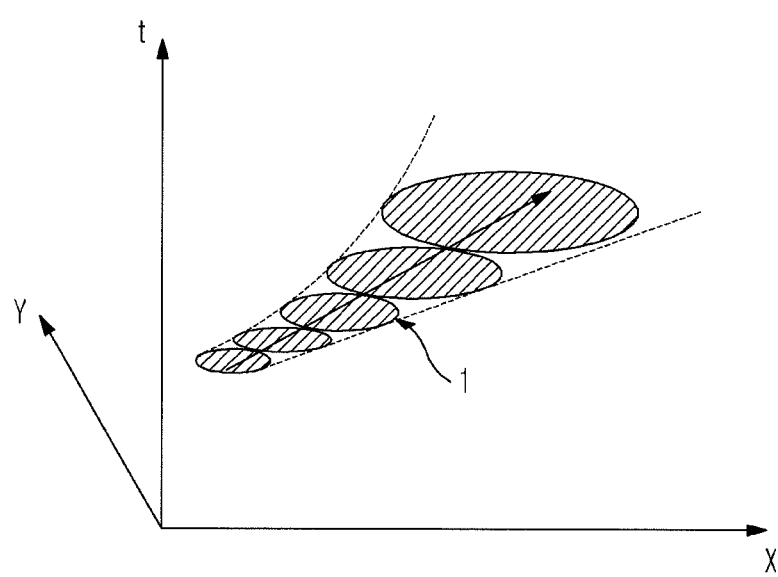
FIG. 9 is a conceptual diagram illustrating the probability of object position being changed with time when creating the robot path according to an embodiment.

In addition, while the object 1 moves at a constant speed, the probability of the object 1's presence is proportional to the square of a time value. In other words, if the object 1 is present, the moving track of the object 1 is shown as a conical object, and each lattice present in the object 1 has the value of 'x'. FIG. 9 is a conceptual diagram illustrating the probability of object position being changed with time when creating the robot path according to an embodiment.

Needless to say, the probability for the non-moving obstacle is fixed to 1.

Subsequently, the distance cost and the obstacle cost are summed, and a path having a minimum sum is selected in operation 410.

The accumulated value of the sum of the distance cost and the obstacle cost is changed according to a method for passing through the path. The optimum path can minimize the accumulated resultant value, as shown in the following equation.

$$P(l) = \sum_{xi, yi \in l} (dl(xi, yi) + dg(xi, yi))$$

In other words, creation of the optimum moving path according to the lapse of time can be achieved by the following process.

The distance cost and the obstacle cost needed for the current node are set to P(1).

In addition, a candidate group of a lattice acting as the next destination from the departure node 3 is decided, and the distance cost and the obstacle cost between each lattice and a current lattice are calculated and summed. If the obstacle cost is set to 1, the space definitely decided as an obstacle is excluded from the candidate group. Therefore, the candidate group can be represented by the following equations.

$$P(2_1)_{candidate} = P(1) + dl(2_1) + dG(2_1)$$
$$P(2_2)_{candidate} = P(1) + dl(2_2) + dG(2_2)$$
$$\vdots$$
$$P(2_n)_{candidate} = P(1) + dl(2_n) + dG(2_n)$$

In these equations, an empirical predicted value H(x,y) is calculated to search for a minimum value. The empirical predicted value is adapted to predict how much accumulated costs are needed from a current lattice to a goal lattice. Since it is difficult for the position and shape of the object 1 to be applied to the empirical predicted value H(x,y), so that only the distance to the goal line is calculated and established in 3D space.

If the distance (t) to the goal line is shorter than LA/max shown in FIG. 6, the distance (t) can be represented by the following equation by measuring a 3D distance.

$$H(k) = \sqrt{(x_k - x_{goal})^2 + (y_k - y_{goal})^2 + w(t_k - t_{goal})^2} \quad \text{[Equation]}$$

Based on the above-mentioned equation, a minimum value of the predicted path is selected among candidate groups.

The predicted path can be represented by the following equation.

$$P(2_1)_{candidate} + H(2_1)$$
$$P(2_2)_{candidate} + H(2_2)$$
$$\vdots$$
$$P(2_n)_{candidate} + H(2_n)$$

If the minimum value is decided, the proceeding path corresponding to a minimum value is selected as an optimum moving path of the robot, as represented by the following equation.

$$P(2) = \min_{i \in n} \{P(2_i)_{candidate} + H(2_i)\} \quad \text{[Equation]}$$

Subsequently, it is determined whether the object arrives at the destination node 5 after departing from the departure node 3 in operation 500.

If the object has not arrived at the destination node, this means that the wrong path or the wrong obstacle cost has been calculated, and the departure node 3 and the designation node 5 are re-established in operation 340.

If the object has arrived at the destination node, it is determined whether the robot moves along the selected optimum moving path in operation 510. If the robot does not move along the selected optimum moving path, the process returns to operation 340 so that the departure node 3 and the destination node 5 are established. If the robot moves along the optimum moving path, the path creation process and robot movement related to the created path are completed.

Figure 3:
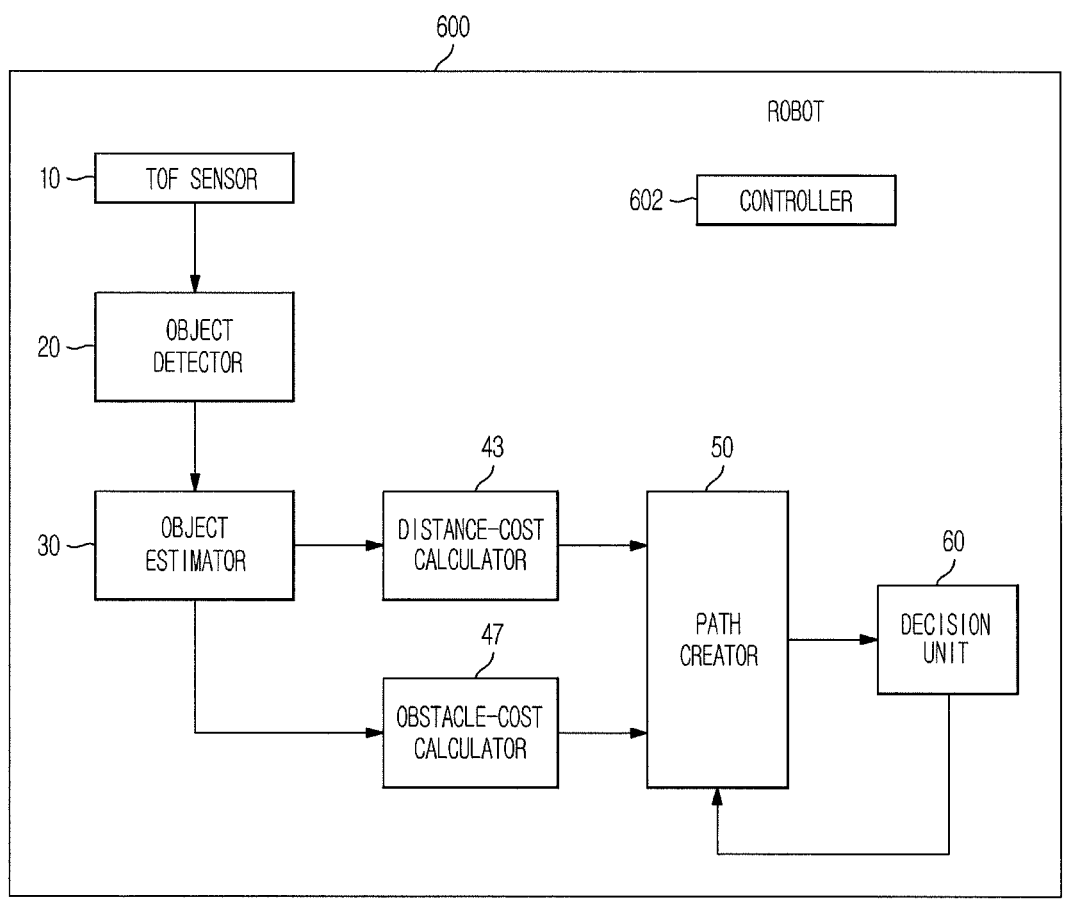
FIG. 3 is a conceptual diagram illustrating a method for controlling a robot according to another embodiment.

FIG. 3 is a conceptual diagram illustrating a method for controlling a robot according to another embodiment.

Referring to FIG. 3, the robot 600 includes a TOF sensor 10, an object detector 20, an object estimator 30, a distance-cost calculator 43, an obstacle-cost calculator 47, a path creator 50, and a decision unit 60.

The TOF sensor 10 measures the distance to the object 1 so as to create a depth map including a plurality of cells.

The object detector 20 divides a boundary between several cells into a plurality of partitions according to a depth of each cell contained in the depth map generated through the TOF sensor 10, extracts a single closed loop formed by the divided boundary, and detects the position and shape of the object 1 located at a first time using the extracted single closed loop.

The object estimator 30 calculates the probability that the object is located at a second time after t seconds on the basis of the detected position and shape of the object 1 located at the first time, so that it can estimate the object.

The distance-cost calculator 43 sets one of the nodes to a departure node 3, sets a destination node 5 acting as the last point of the path, and accumulates the distance values for the other node ranging from the selected node to the destination node 5, thereby calculating the distance cost.

The obstacle-cost calculator 47 indicates the probability of the robot encountering a 2D shape such as the object 1.

The path creator 50 generates a path requiring both a shortest time and a shortest distance simultaneously while avoiding the object 1 according to the positioning probability of the object 1.

The decision unit 60 determines whether the created path will arrive at the destination node 5. If the created path will not arrive at the destination node 5, the departure node 3 is re-changed to another node.

As shown in FIG. 3, the robot 600 also includes a controller 602 which controls the robot to move along the created path.

As is apparent from the above description, the robot and a method for creating the robot path according to an embodiment can create an optimum path without colliding with the object.

The embodiments can be implemented in computing hardware and/or software, such as (in a non-limiting example) any computer that can store, retrieve, process and/or output data and/or communicate with other computers. For example, TOF sensor 10, object detector 20, object estimator 30, distance-cost calculator 43, obstacle-cost calculator 47, path creator 50, decision unit 60 and/or controller 602 in FIG. 3 may include a computer to perform calculations and/or operations described herein. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method for planning a path of a robot comprising:
   generating, by a computer, a depth map including a plurality of cells by measuring a distance to an object;
   dividing a boundary among the plurality of cells into a plurality of partitions according to individual depth values of the cells, and extracting a single closed loop formed by the divided boundary;
   obtaining a position and shape of the object located at a first time through the extracted single closed loop;

calculating, by a computer, a probability where the object can be located at a second time after t seconds on the basis of the obtained position and shape of the object located at the first time; and creating a moving path of the robot simultaneously while avoiding the object according to the calculated probability, wherein the calculating includes calculating the probability where the object can be located at the second time after t seconds on the basis of the obtained position and the shape of the object using a Joint Probability Data Association Filter (JPDAF).

2. The method according to claim 1, wherein the extracted single closed loop is extracted through a binary large object (Blob) algorithm.

3. The method according to claim 2, wherein the obtaining of the position and the shape of the object located at the first time through the extracted single closed loop includes:

obtaining the position of the object on the basis of an average of depth values of one or more pixels contained in the single closed loop, and obtaining the shape of the object on the basis of the shape of the single closed loop.

4. The method according to claim 1, wherein the JPDAF includes a Kalman filter algorithm.

5. The method according to claim 4, wherein the creating of the moving path simultaneously while avoiding the object according to the calculated probability includes:

displaying a 2D shape based on the calculated probability of the object presence in 3D space according to time (t).

6. The method according to claim 5, wherein the creating of the moving path simultaneously while avoiding the object according to the calculated probability includes:

dividing the 3D space into a plurality of lattices, each of which has a predetermined length and a predetermined time.

7. The method according to claim 6, wherein the plurality of lattices is a plurality of nodes, each of which is used as a reference point to create the path.

8. The method according to claim 7, wherein the creating of the moving path simultaneously while avoiding the object according to the calculated probability includes:

determining one of the nodes to be a departure node, selecting a destination node acting as a destination point of the path, and calculating a distance cost obtained by accumulation of distance values ranging from the selected node to another node acting as an intermediate node toward the destination node.

9. The method according to claim 8, wherein the creating of the moving path simultaneously while avoiding the object according to the calculated probability related to the object presence includes:

calculating an obstacle cost indicating a probability that the robot encounters a 2D shape having the calculated probability related to the object presence.

10. The method according to claim 9, wherein the creating of the moving path simultaneously while avoiding the object according to the calculated probability related to the object presence includes:

summing the distance cost and the obstacle cost, and forming a path having a minimum sum of the distance cost and the obstacle cost.

11. The method according to claim 10, further comprising: determining whether the created path will arrive at the destination node.

12. The method according to claim 11, wherein the determining whether the created path will arrive at the destination node includes:

if the created path will not arrive at the destination node, resetting another node to the departure node.

13. The method according to claim 1, further comprising: controlling the robot to move along the created moving path.

14. A robot comprising:

a Time Of Flight (TOF) sensor configured to generate a depth map including a plurality of cells by measuring a distance to an object;

an object detector configured to divide a boundary between several cells into a plurality of partitions according to a depth of each cell, extract a single closed loop formed by the divided boundary, and detect the position and shape of the object located at a first time using the extracted single closed loop;

an object estimator configured to calculate a probability where the object can be located at a second time after t seconds on the basis of the detected position and shape of the object located at the first time; and a path creator configured to create a moving path of the robot without colliding with the object according to the calculated probability, wherein the object estimator is configured to calculate the probability where the object can be located at a second time after t seconds on the basis of the obtained position and the shape of the object using a Joint Probability Data Association Filter (JPDAF).

15. The robot according to claim 14, wherein the object detector is configured to detect the position and the shape of the object located at the first time using a binary large object (Blob) algorithm.

16. The robot according to claim 15, wherein the object detector is configured to obtain the position of the object on the basis of an average of depth values of one or more pixels contained in the single closed loop, and obtain the shape of the object on the basis of the shape of the single closed loop.

17. The robot according to claim 14, wherein the path creator is configured to display a 2D shape based on the calculated probability of the object presence in 3D space according to the time (t), and divide the 3D space into a plurality of lattices, each of which has a predetermined length and a predetermined time, wherein the plurality of lattices is a plurality of nodes, each of which is used as a reference point to create the path.

18. The robot according to claim 17, wherein the path creator is configured to determine one of the nodes to be a departure node, select a destination node acting as a destination point of the path, and calculate a distance cost obtained by accumulation of distance values ranging from the selected node to another node acting as an intermediate node toward the destination node.

19. The robot according to claim 18, wherein the path creator includes:

an obstacle-cost calculator configured to calculate an obstacle cost indicating a probability that the robot encounters a 2D shape having the calculated probability related to the object presence.

20. The robot according to claim 19, wherein the path creator is configured to sum the distance cost and the obstacle cost, and form a path having a minimum sum of the distance cost and the obstacle cost.

21. The robot according to claim 20, wherein the path creator is configured to determine whether the created path will arrive at the destination node, and if the created path will not arrive at the destination node, reset another node to the departure node.

22. The robot according to claim 14, further comprising: a controller configured to control the robot to move along the created moving path.

* * * * *